(12) United States Patent
Shemesh et al.

(10) Patent No.: US 7,522,688 B2
(45) Date of Patent: Apr. 21, 2009

(54) WIRELESS CLOCK SYSTEM AND METHOD

(75) Inventors: Ilan Shemesh, Huntingdon Valley, PA (US); Goll Ofec, Rishon-Iezion (IL); Leor Hardy, Glvatayim (IL); Yariv Oren, Magshimim (IL); Paz Hameiri, Rehovot (IL)

(73) Assignees: The Sapling Company, Inc., Huntingdon Valley, PA (US); Virtual Extension, Tel-Aviv (IL)

( * ) Notice: Subject to any disclaimer, the term of this patent is extended or adjusted under 35 U.S.C. 154(b) by 525 days.

(21) Appl. No.: 11/116,084

(22) Filed: Apr. 27, 2005

(65) Prior Publication Data

US 2006/0050772 A1 Mar. 9, 2006

Related U.S. Application Data

(60) Provisional application No. 60/565,937, filed on Apr. 27, 2004.

(51) Int. Cl.
*H04L 7/00* (2006.01)
(52) U.S. Cl. .................. 375/356; 375/357; 375/373; 375/132; 455/462; 368/10; 368/47
(58) Field of Classification Search .................. 375/354, 375/356, 357, 373, 132; 455/462; 368/10, 368/47
See application file for complete search history.

(56) References Cited

U.S. PATENT DOCUMENTS

| | | | | |
|---|---|---|---|---|
| 5,677,895 A | * | 10/1997 | Mankovitz | 368/10 |
| 5,805,530 A | * | 9/1998 | Youngberg | 368/47 |
| 5,898,929 A | * | 4/1999 | Haartsen | 455/462 |
| 7,295,546 B2 | * | 11/2007 | Reunam ki | 370/350 |
| 2005/0259722 A1 | | 11/2005 | Vanlonden et al. | |

* cited by examiner

*Primary Examiner*—Phuong Phu
(74) *Attorney, Agent, or Firm*—Lucas & Mercanti, LLP

(57) ABSTRACT

A wireless clock system includes a master clock or other master time source, and a plurality of slave clocks or repeater devices. Each slave clock can both wirelessly receive and wirelessly transmit time signals including current time data. To avoid conflicts among the slave clocks, each slave clock transmits time signals in a frequency-hopping manner over pseudo-randomized frequencies and at pseudo-randomized transmission start times. In another embodiment, power consumption at the slave clocks is minimized by activating and deactivating receivers within the slave clocks at predetermined times and at predetermined intervals, each interval being longer than the previous interval, until valid time signals are received from either the master clock or another slave clock. Calibration of the slave clock's time base is also performed.

22 Claims, 7 Drawing Sheets

| Master clock | first slave clock | FIG. 10 | second slave clock | |
|---|---|---|---|---|
| 1:00 | 1:00 | | 1:00 | |
| 2:00 | 2:00 | | 2:00 | |
| 3:00 | 3:00 | | 3:00 | |
| 1:23 | 3:59 | | 3:59 | |
| 1:24 | 4:00 | 1:24 | 4:00 | |
| 2:00 | | 2:00 | | |
| 2:24 | | 2:24 | 5:00 | |
| 3:00 | | 3:00 | | |
| 3:24 | | 3:24 | 6:00 | |
| 4:00 | Trans | 4:00 | | |
| 4:24 | | 4:24 | 7:00 | |
| 5:00 | | 5:00 | | |
| 5:24 | Trans | 5:24 | 8:00 | |
| 6:00 | | 6:00 | | |
| 6:24 | | 6:24 | 9:00 | |
| 7:00 | | 7:00 | | |
| 7:24 | | 7:24 | 10:00 | |
| 8:00 | Trans | 8:00 | | |
| 8:24 | | 8:24 | 11:00 | |
| 9:00 | | 9:00 | | |
| 9:24 | Trans | 9:24 | 12:00 | 9:24 |
| 10:00 | | 10:00 | | 10:00 |
| 10:24 | | 10:24 | | 10:24 |
| 11:00 | | 11:00 | | 11:00 |
| 11:24 | | 11:24 | | 11:24 |
| 12:00 | Trans | 12:00 | | 12:00 |
| 12:24 | | 12:24 | | 12:24 |
| 1:00 | | 1:00 | | 1:00 |
| 1:24 | Trans | 1:24 | | 1:24 |
| 2:00 | | 2:00 | | 2:00 |
| 2:24 | | 2:24 | | 2:24 |
| 3:00 | | 3:00 | | 3:00 |
| 3:24 | | 3:24 | | 3:24 |
| 4:00 | Trans | 4:00 | | 4:00 |
| 4:24 | | 4:24 | | 4:24 |
| 5:00 | | 5:00 | | 5:00 |
| 5:24 | Trans | 5:24 | | 5:24 |
| 6:00 | | 6:00 | | 6:00 |
| 6:24 | | 6:24 | | 6:24 |
| 7:00 | | 7:00 | | 7:00 |
| 7:24 | | 7:24 | | 7:24 |
| 8:00 | Trans | 8:00 | | 8:00 |
| 8:24 | | 8:24 | | 8:24 |
| 9:00 | | 9:00 | | 9:00 |
| 9:24 | Trans | 9:24 | | 9:24 |
| 10:00 | | 10:00 | | 10:00 |
| 10:24 | | 10:24 | | 10:24 |
| 11:00 | | 11:00 | | 11:00 |
| 11:24 | | 11:24 | | 11:24 |
| 12:00 | Trans | 12:00 | | 12:00 |

FIG. 10

WIRELESS CLOCK SYSTEM AND METHOD

CROSS-REFERENCE TO RELATED APPLICATION

This application is entitled to the benefit of U.S. Provisional Patent Application Ser. No. 60/565,937, filed Apr. 27, 2004. Such application is incorporated herein by reference.

FEDERALLY SPONSORED RESEARCH

Not Applicable

SEQUENCE LISTING OR PROGRAM

Not Applicable

BACKGROUND OF THE INVENTION

Traditional wireless clock systems known in the market today typically consist of a "master" clock having a wireless transmitter and multiple secondary or "slave" clocks having wireless receivers. The secondary clocks may be installed in many rooms in a school, industrial location, large office building or the like. One reason for using a "master-slave" type system is to permit the master clock to maintain the time at all of the secondary clocks in synchronization with the time at the master clock. To do this, typically, the master clock transmits a periodic time signal, correction signal or the like to the secondary clocks. The secondary clocks receive the signal and display the time, or perform a time correction operation, if necessary.

A disadvantage of such a system is that the size of the system is limited to the distance between the master clock transmitter and the secondary clock receivers. Over a long distance, or in electrically noisy or interfering environments, the secondary clocks may not be able to receive valid time signal data from the master clock.

Another disadvantage of this type of system is that the master clock transmitter normally transmits the time signal over a single radio frequency. Therefore, if there is noise or interference at or near that frequency, it will most likely affect the ability of the secondary clocks to receive accurate time data, unless the transmission frequency is changed manually.

Also, in a system containing multiple secondary or slave clocks, each of which may wirelessly transmit simultaneously, another issue to be addressed is how to prevent the slaves from conflicting with each other. In this context, "conflict" means that a clock receives signals from two or more other clocks simultaneously. The signals may be out of phase. If so, the clock receiving both signals would not "know" which signal to use for accurate timekeeping.

Thus, a need exists for a system and method to prevent signaling and other conflicts at the secondary clocks, particularly in large clock systems operating over long distances or in noisy environments.

SUMMARY OF THE INVENTION

To overcome the disadvantages of the prior art, a master/slave clock system has been invented whereby slave or secondary clocks or other devices are configured to communicate not only with a master time source such as a master clock, but also with other slave clocks, in cascading fashion. More particularly, each slave clock is configured to both wirelessly receive and wirelessly transmit time signals containing or representing time data. Each slave clock may be configured to operate either as a traditional slave clock, or as a "repeater" device for communicating with other slave clocks or other repeater devices. Normally, only one master clock is included in the system.

As used herein, the term "slave clock" is used to refer to any instrument that operates as a "repeater" or relay device to receive time signals from another source of time data, and then to transmit its own time signals containing the time data to other instruments. The instrument may, but need not, be a "clock" in the traditional sense, namely a device having analog hands or a digital or other display device that physically displays the time.

In the present invention, if multiple slave clocks are used in a clock installation, a type of "cascade" or "bucket brigade" arrangement is formed. Each slave clock operates in synchronization with both the master clock and with each of the other slave clocks. Since multiple slaves can now "control" or signal other multiple slaves, clock installations of almost unlimited size may be constructed.

In one embodiment, the present invention minimizes or completely prevents signal conflicts at the slave clocks by using frequency hopping and pseudo-randomized selection and timing of frequencies over which time signals are transmitted and re-transmitted. The use of "double randomness" in the transmissions makes it extremely unlikely that a signal conflict will occur at any slave clock.

More particularly, the invention comprises a wireless clock system comprising:

(a) a master time source including means for wirelessly transmitting first time signals containing time data;

(b) a first slave clock, the first slave clock including means for wirelessly receiving the first time signals, the first time signals causing the first slave clock to operate in synchronization with the master time source;

(c) the first slave clock further including means for wirelessly transmitting second time signals containing the time data; and (d) a second slave clock, the second slave clock including means for wirelessly receiving the second time signals, the second time signals causing the second slave clock to operate in synchronization with the first slave clock.

In another embodiment, the invention comprises a method of operating a wireless clock system, comprising the steps of:

(a) wirelessly transmitting first time signals from a master time source, the first time signals containing time data;

(b) wirelessly receiving the first time signals at a first slave clock, the first time signals causing the first slave clock to operate in synchronization with the master clock;

(c) wirelessly transmitting second time signals from the first slave clock, the second time signals containing the time data; and (d) wirelessly receiving the second time signals at a second slave clock, the time signals causing the second slave clock to operate in synchronization with the first slave clock.

In another embodiment, the invention comprises a wireless clock system comprising:

(a) a master time source including means for wirelessly transmitting time signals including current time data;

(b) at least one slave clock, the slave clock including receiving means for receiving the time signals; and (c) means within the slave clock for conserving power by automatically activating and deactivating the receiving means at predetermined times and at predetermined intervals, each interval being longer than the previous interval, until valid time data is recognized from the time signals.

In another embodiment, the invention comprises a method of operating a wireless clock system, comprising the steps of:

(a) wirelessly transmitting time signals including current time data from a master time source; and (b) activating and deactivating a wireless receiver within a slave clock at predetermined times and at predetermined intervals, each interval being longer than the previous interval, until valid time data is recognized from the time signals.

In another embodiment, the invention comprises a wireless clock system comprising:

(a) a master time source having a master time base and having transmitting means for wirelessly transmitting time signals including current time data;

(b) at least one slave device, the slave device having a slave time base and having receiving means for receiving the time signals; and (c) means for calibrating the slave time base with the master time base.

In another embodiment, the invention comprises a wireless clock system comprising:

(a) a master time source including means for wirelessly transmitting first time signals containing time data;

(b) a first repeater, the first repeater including means for wirelessly receiving the first time signals; and (c) the first repeater further including means for wirelessly transmitting second time signals containing the time data.

In another embodiment, the invention comprises a wireless clock comprising:

a clock including means for wirelessly transmitting time signals in a frequency hopping manner;

the frequency hopping being performed in a doubly pseudo-random manner, in which the time signals are transmitted pseudo-randomly from among preselected transmission frequencies within a preselected range and at pseudo-randomly selected transmission start times within a preselected range.

In another embodiment, the invention comprises a wireless clock system comprising:

(a) a master time source including means for wirelessly transmitting, at pseudo-random frequencies and at pseudo-random times, time signals containing data representing a current master time and a master time base;

(b) at least one slave clock, the slave clock capable of wirelessly and automatically receiving the time signals; and (c) the slave clock further including means for wirelessly receiving the time signals, the time signals causing the second slave clock to operate in synchronization with the current master time, and causing a time base of the slave clock to be calibrated with the master time base.

BRIEF DESCRIPTION OF THE DRAWINGS

These and other features and advantages of the invention will now be described with reference to the drawings of certain preferred embodiments, which are intended to illustrate and not to limit the invention, and in which like reference numbers represent corresponding parts throughout, and in which:

FIG. 10 shows a tabulation of clock times displayed at three clocks over a 24-hour period, showing the ability of slave clocks of the present invention to adjust themselves to time changes at a master clock.

DETAILED DESCRIPTION OF THE INVENTION

According to one embodiment of the present invention, the invention comprises a wireless clock system that normally includes one master time source, such as a master clock, and one or more secondary or "slave" clocks. Preferably, more than one slave clock is used. The clocks may be installed in a large facility where the physical distances between the clocks may be large.

Each secondary clock in the system includes a transceiver that both receives and transmits time signals. The time signals include or represent current time data. This data is preferably based on or obtained from a highly accurate master time source that includes current time data, and in some cases data representing the status of the current time base of the master clock.

One advantage of such a system is that the system is not limited to the distance between the master clock and the secondary clocks, because each secondary clock may be configured to operate as a "repeater" for transmitting or re-transmitting time signals to other secondary clocks. Thus, it is not necessary for every secondary clock to be installed within wireless receiving range of the master clock, as long as each secondary clock is within range of at least one other secondary clock, or within range of an external wireless source of time data.

Figure 9:
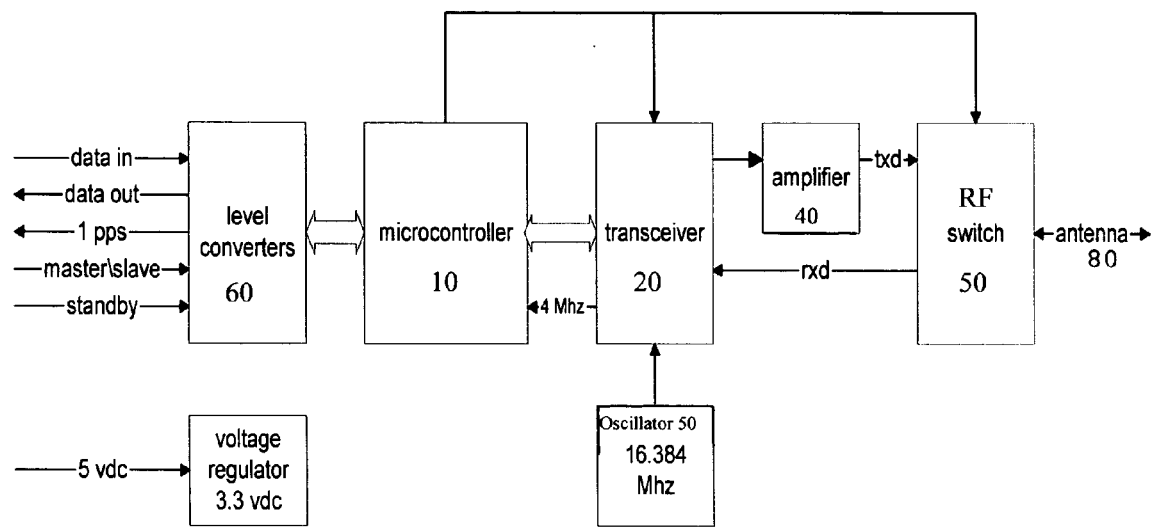
FIG. 9 is a block diagram of a transceiver circuit used in the invention.

A block diagram of a preferred embodiment of the invention is shown in FIG. 9. The invention includes a microcontroller 10 coupled to and controlling a transceiver 20. Preferably, transceiver 20 is a frequency shift keying (FSK) transceiver that includes both a receiver portion or operating mode, and a transmitter portion or operating mode, and operating at radio frequency (RF).

The microcontroller 10 causes the transceiver 20 to receive and transmit time signals usually alternately, preferably in a frequency hopping manner. The frequencies are preferably within a preselected range, such as the 915-928 MHz frequency range. The microcontroller controls the direction of signals from the antenna by an RF switch 50. When the transceiver transmits, signals come out from the microcontroller to the transceiver, and from the transceiver to an amplifier 40. From the amplifier the signals move through the RF switch to an antenna 80. When the transceiver receives, the signals come from the antenna to the RF switch to the transceiver and from it to the microcontroller.

In an alternative embodiment, the microcontroller may be configured to cause the transceiver to either continuously receive or continuously transmit signals.

Preferably, the present invention operates under software control. The software is stored in a memory unit (not shown) contained within or coupled to microcontroller 10 (FIG. 9). Microcontroller 10 may be programmed from the outside with data sent through a link passing through level converters 60.

In FIG. 9, several data lines are shown coupled to the circuit element labeled level converters 60. The "data in" line receives time data from a source such as another microcontroller (not shown). This time data operates or controls the slave clock's time base, or internal time, which runs continuously. The time data also is later encoded into time signals that are subsequently transmitted over antenna 80 by transceiver 20 when the transceiver is in transmit mode.

The "data out" line carries time signals generated by microcontroller 10 to an analog movement or other display device (not shown) that displays the slave clock's internal time, if the slave clock is being used as a physical clock. Otherwise, if the slave clock is only being used as a repeater device, the movement or display device is not necessary; nothing is displayed; and the data out line is not necessary.

The "1 pps" line is used to generate "ticks", namely to move an analog second hand forward by one pulse per second, if an analog movement is included with the slave clock. Otherwise, if the slave clock is only being used as a repeater device, the "pps" line is not necessary.

The "master\slave" line sends data that causes the transceiver to either transmit signals (while in temporary master mode) or to both receive and send signals (while in slave mode). In other words, the "master\slave" input defines the mode of operation. This line can be connected to a switch that, when activated, causes the device to assume the role of "master clock" temporarily. In one example, an applied voltage of 0v may represent master mode, and an applied voltage of 5v may represent slave mode. The microcontroller reads the "master\slave" input to decide in which mode it operates. When it is in master mode, it uses its UART (universal asynchronous receiver-transmitter) to receive the data coming through its "data in" input at various baud rates.

The "standby" line is used if an operator wishes to shut down the slave clock.

Preferably, the invention has two modes of operation, as follows:

(1) Master—Transceiver: In this mode the device receives time signals through its serial communication input ("data in"), and transmits an RF message every 1 minute through its antenna.

(2) Slave—Repeater: In this mode the device receives time signals through its antenna, amplifies the signals and transmits them to the antenna.

Preferably, the master clock wirelessly transmits a time signal once per minute, and each slave clock wirelessly transmits a time signal once every four hours. Other intervals could, of course, be used instead, if desired.

Figure 1:
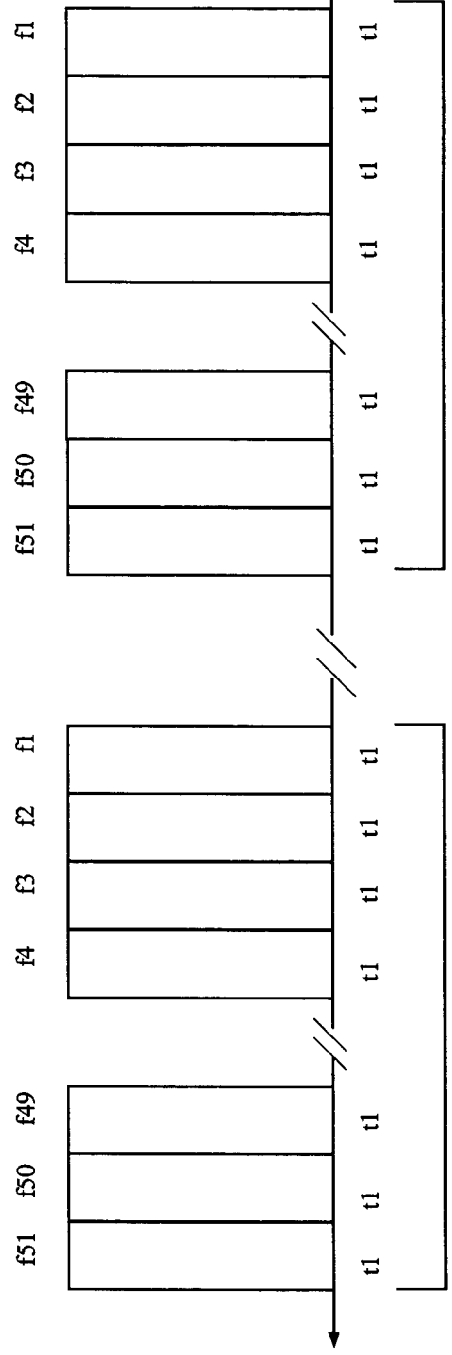
FIGS. 1-5 are timing diagrams illustrating sequences of time signals transmitted by clocks of one embodiment of the present invention.

Turning next to FIG. 1, in a preferred embodiment, the master clock and all of the secondary clocks transmit data representing time signals over 51 different preselected frequencies in the range of, for example, 915 MHz to 928 MHz. Preferably, these frequencies are preselected during or before the manufacture of the slave clock, and are either hard-wired into the slave clock or stored in a memory (not shown) within the slave clock.

Time signals are transmitted in a series of "frames" of data ("f1", "f2" etc.) having periods ("t1") of equal duration, for example 10 milliseconds each. The flow of time in FIG. 1 is illustrated by the horizontal arrow, the direction of flow being from right to left.

In a feature of the invention, each frame of data is transmitted over a different frequency in a pseudo-random frequency-hopping manner. Each frequency is randomly chosen from among the 51 different preselected frequencies mentioned above. This "hopping" is preferably "back and forth" rather than uniformly increasing or decreasing. For example, the first frame f1 may be transmitted at 916 MHz, frame f2 may be transmitted at 917 MHz, frame f3 may be transmitted at 915 MHz, and so on out to frame f51. In this example, as shown in FIG. 1, since each frame of data is 10 milliseconds long per each frequency, the total transmission time ("T") is 0.51 seconds, representing 51 frequencies times 10 milliseconds per frequency, or in other words "T=51×t1."

Figure 2:
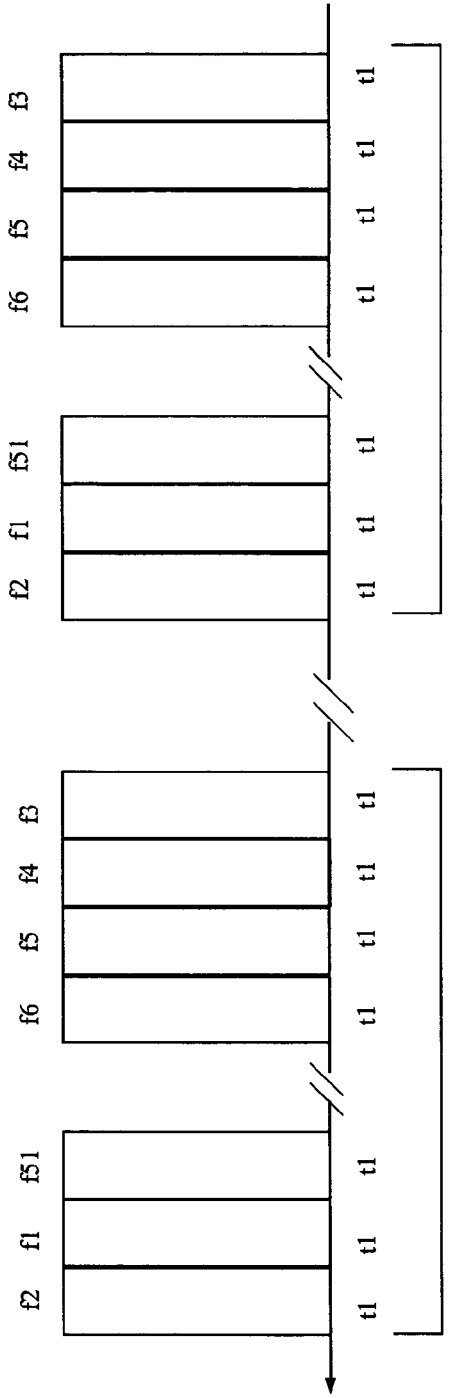

In order to avoid interference among all the secondary clock units that are transmitting time, and in another feature of the invention, each unit starts the transmission at a random frequency. For example, FIG. 1 shows a unit that starts transmitting in frequency 1 (f1) and ends the transmission of a set of data in frequency 51 (f51), while FIG. 2 shows a different unit that starts transmitting in frequency 3 (f3) and ends the transmission in frequency 2 (f2). The order of hopping from one frequency to another may either be the same in all units, or may be pseudo-randomly chosen from among the 51 preselected frequencies. All 51 frequencies are used. In this manner, the slave clocks avoid interrupting or interfering with each other.

Figure 3:
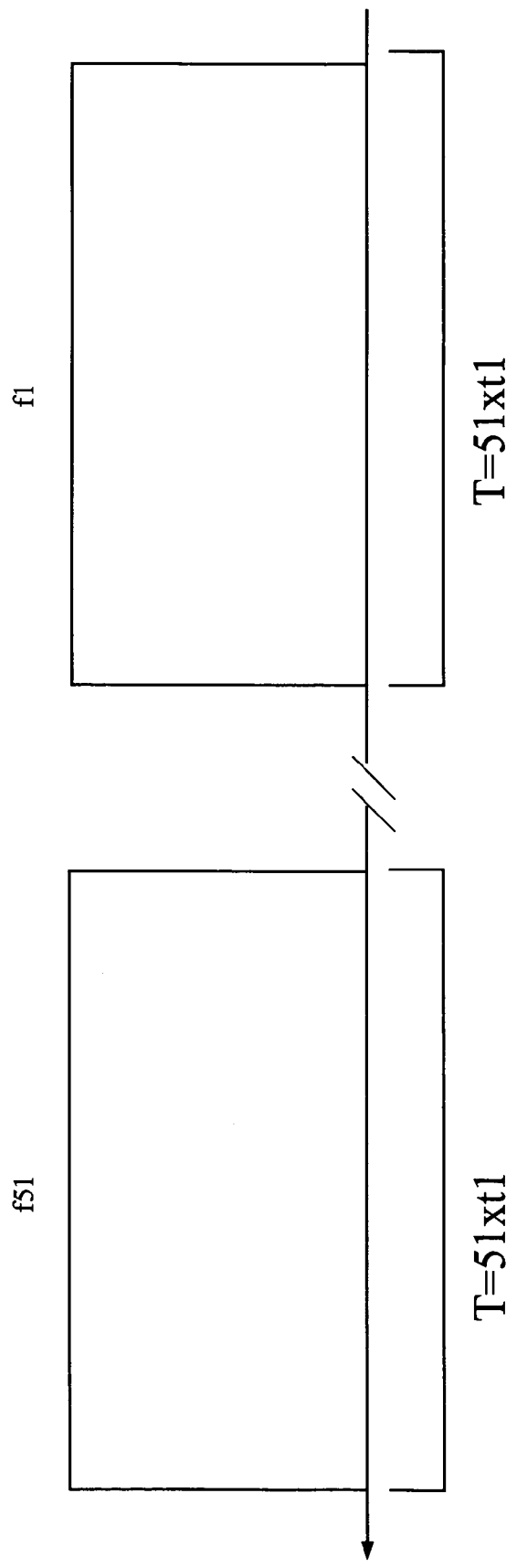

Looking next at FIG. 3, the receiver portion of the transceiver in each secondary clock unit is tuned to the first frequency for a total time of 0.51 (T) seconds to insure receiving data in this specific frequency. If, however, valid time data is not received for some reason, the receiver will hop or jump to the next frequency and the microcontroller 10 (FIG. 9) in each unit will "open" or activate the receiver again for 0.51 (T) seconds and will continue to do so until it receives valid data. FIG. 3 shows that the receiver is open in frequency 1 (f1) for total time of T and will, if necessary, continue hopping from one frequency to another until ending at frequency 51 (f51).

Figures 4, 5:
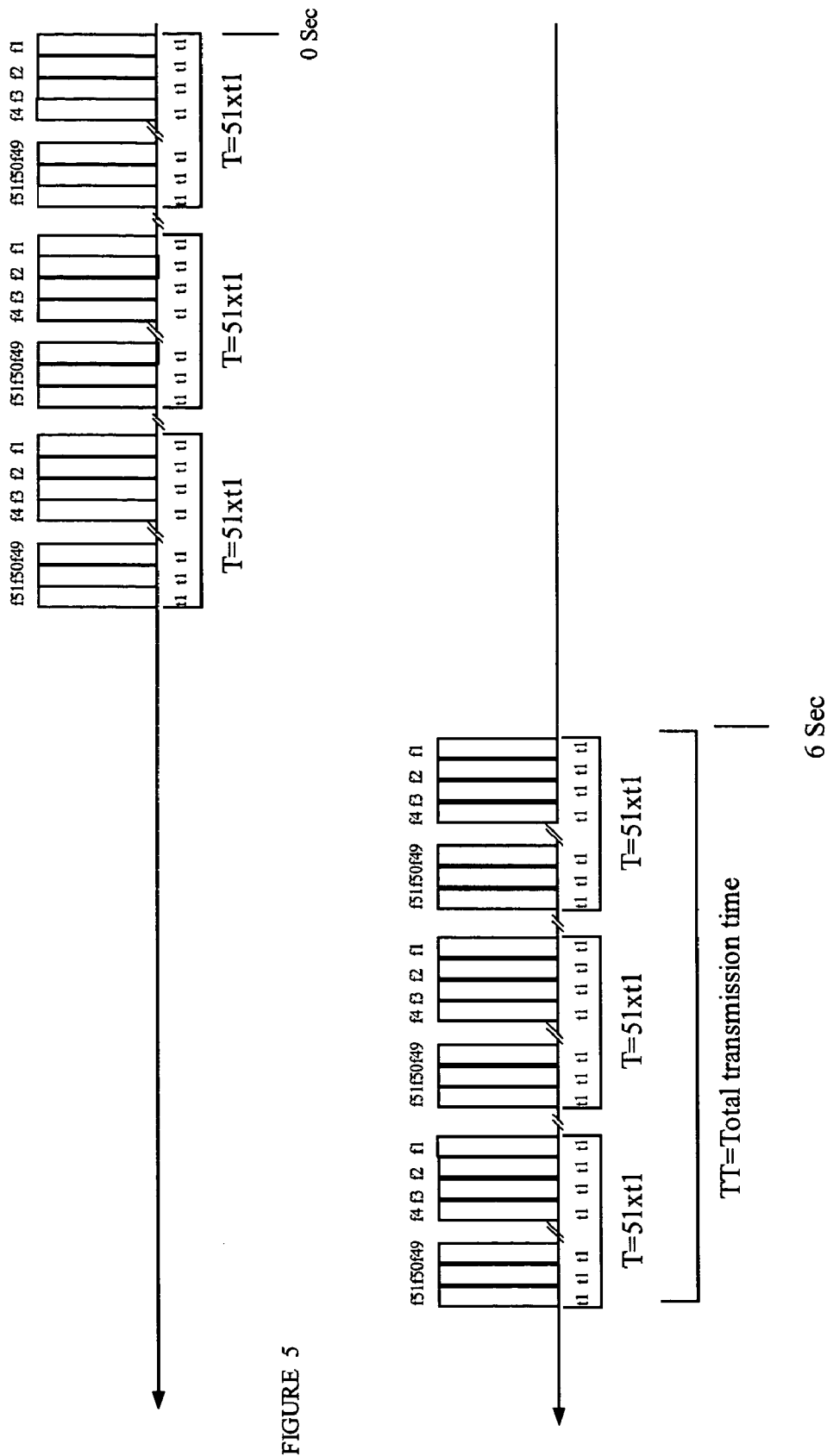

In yet another feature of the invention, in order to avoid interruption or interference between two units that start transmission in the same frequency, each unit will also be randomly or pseudo-randomly shifted in time from each other. In other words, the time of the start of transmission of time signal data is randomly or pseudo-randomly initiated from within a preselected range of starting time points. For example, if the total transmission time is 0.51 (T) seconds, and the unit transmits 10 sets of data in all 51 frequencies, the grand total of transmission time in this example is 5.11 seconds. This means that if the unit pseudo-randomly transmits in 6-second intervals from each other, this ensures that there will be no interference with each other. FIG. 4 shows a transceiver that started transmitting at 0 time and FIG. 5 shows a transceiver that started transmission six (6) seconds later. It can clearly be seen that there is no overlap or interference between these two transmissions.

Figure 6:
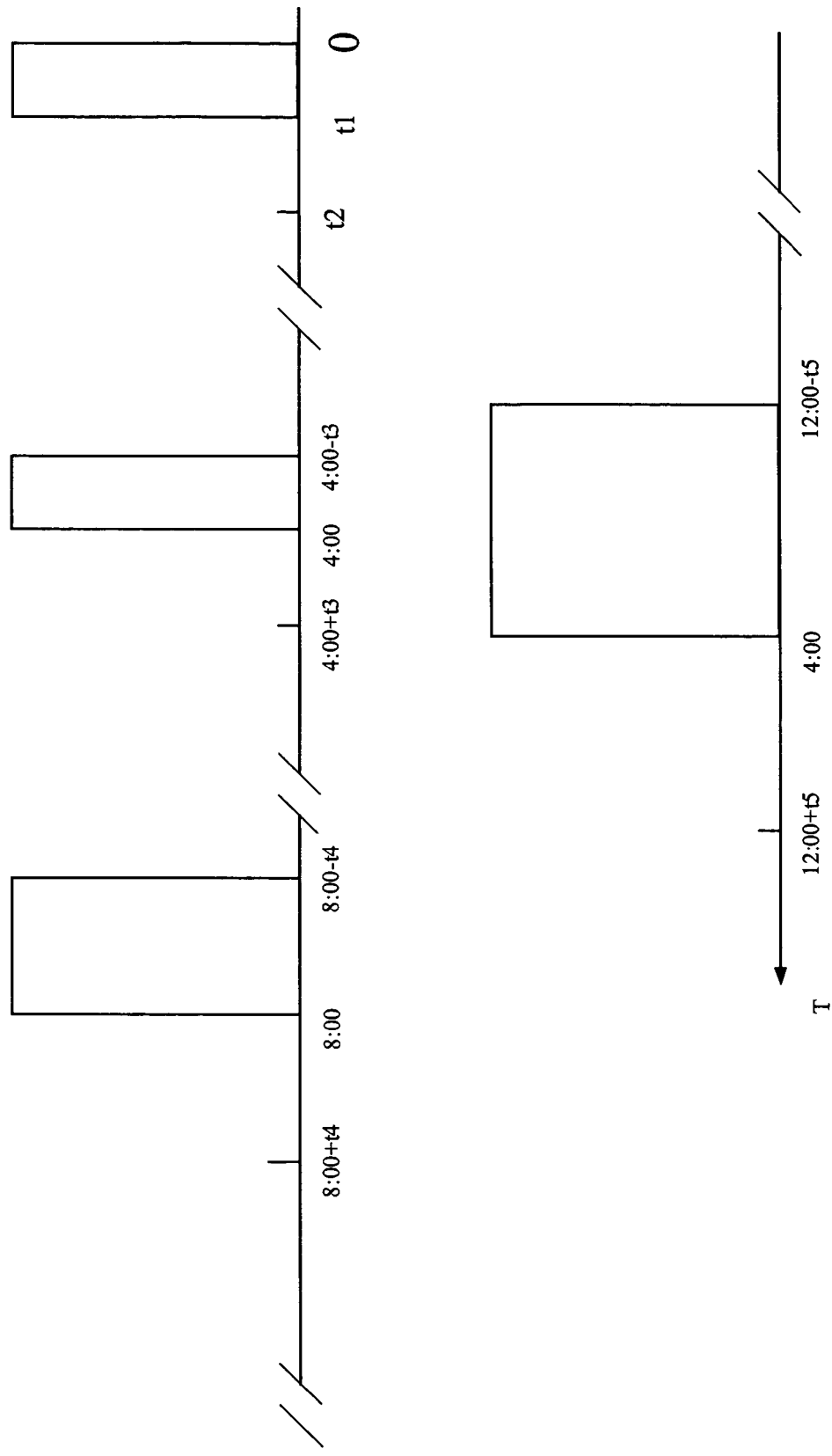
FIG. 6 is a timing diagram of a second embodiment of the invention, illustrating a sequence of intervals during which a receiver of a slave clock is "opened" or activated.
Figure 7:
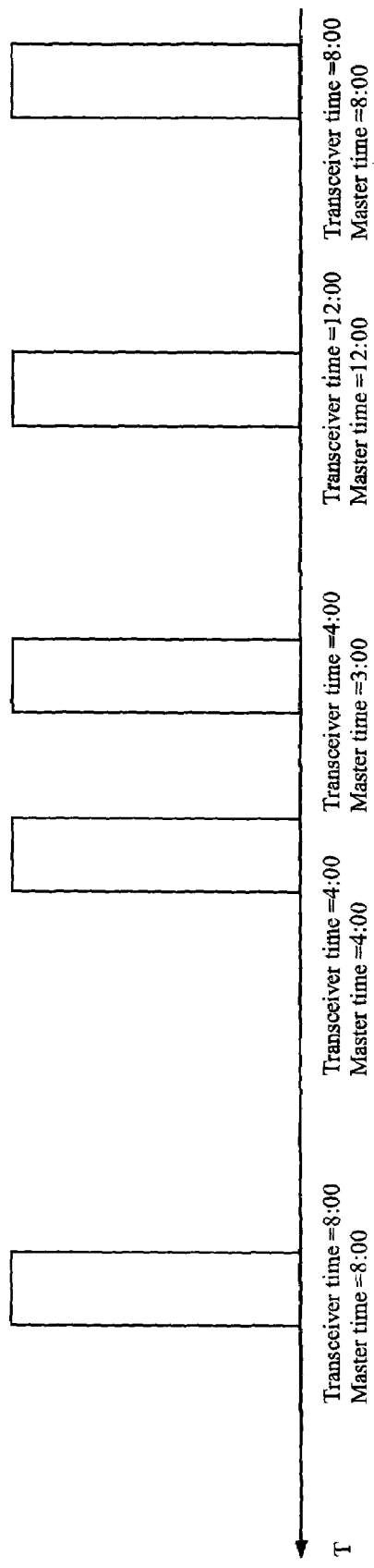
FIG. 7 is a timing diagram of the second embodiment of the invention, illustrating a normal operation of a receiver of a slave clock.
Figure 8:
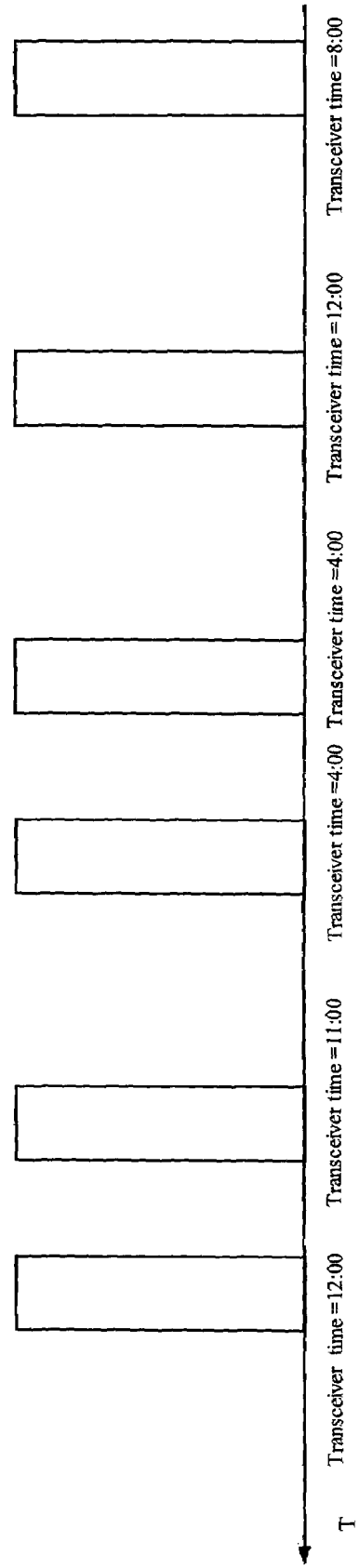
FIG. 8 is a timing diagram of another embodiment of the invention, illustrating transmission of signals by a transceiver of a slave clock.

FIGS. 6-8 illustrate a second embodiment of the invention. This embodiment relates to a wireless master-slave clock system in which each slave clock includes a transceiver that may be battery-powered. In one embodiment, in order to minimize battery power consumption, the microcontroller 10 in each unit "opens" or turns on the receiver portion of its transceiver for the receipt of wireless data upon initial power up, and then at specific times thereafter, such as every four (4) hours, for example at 12:00 o'clock, 4:00 o'clock and 8:00 o'clock.

A potential concern that may arise in this arrangement is when the battery-operated slave clocks are installed first in the absence of an operating master clock. Upon later installation of the master clock, which could be either AC-powered or battery-powered, the master clock will start transmitting continuously and the slave clocks will open their receivers upon power up and at fixed times thereafter and then will synchronize themselves with the master. However, in case a transceiver is out of the receiving range of signals from the master clock, or is in a noisy environment, the slave clock will not receive time signals, or will receive invalid time signals, from the master clock.

To address this concern, and in a feature of the invention, in order for the out-of-range slave clocks to be synchronized with the rest of the system (the master clock and the in-range slave clocks within receiving distance of either the master clock or another slave clock), their receivers must be opened together at the same time that the other transceivers are transmitting time signal data.

As an example, assume that the system includes one master clock, one in-range slave clock and one out-of-range slave clock. In order to enable the first synchronization after the in-range clock has received valid data, an operator pushes or otherwise activates a switch or other control at both the in-range clock that received valid data and the out-of range clock that did not receive valid data. Upon pushing the switch, the unit that did receive the valid data will start transmitting or re-transmitting the data, and the unit that did not receive the valid data will open its receiver in order to receive the valid data. When this event happens, both clocks will be synchronized together, and each clock will then open its transceiver to both receive and transmit every 4 hours thereafter, such as at 12, 4 and 8 o'clock.

Every slave clock checks to see if it has received valid data in the last 12 hours. If so, the clock opens its receiver to receive data for a period of time, and then re-transmits that data for a period of time. The process is repeated until the unit has received valid time data. At that point, the unit switches to a transmit mode only, or the unit will reach time out and will repeat the process 4 hours later.

This embodiment may be used with both battery-powered and AC-powered clocks, where the transceivers are constantly jumping from receiving to transmitting modes.

FIG. 6 shows periods during which the receiver portion of a transceiver in a secondary clock unit is open for data reception. At time 0 (near the right-hand side of FIG. 6), the receiver is opened. If at time t1, the receiver receives valid data, the transceiver is closed or deactivated. If, however, valid data was not received within this period, the reception "window" is opened up again (or kept open) to time t2 and then closes. If valid data is still not received, then at a later time, say 4 o'clock, the "window of opportunity" is opened again at 4 o'clock ±t3. However, if the clock still has not received valid data at 4 o'clock plus t3, then at shortly before 8 o'clock, the receiver is opened for reception for a longer duration of up to ±t4, a "window" of reception that is greater than ±t3. If the receiver still does not receive valid data at 12 o'clock, the slave clock will open the receiver up to ±t5, a window that is greater than ±t4. As can be seen, the "window of opportunity" for the receipt of valid data keeps getting larger (up to a point) until the receiver receives valid data. At this point, the entire system is synchronized. The window then returns to its original narrow width at subsequent times.

Another feature of the invention relates to calibration. Calibration refers to adjustment of a clock's time base, which is different from synchronization. Calibration is important because, even if two clocks have been synchronized, then the clocks will quickly become unsynchronized again unless they are calibrated. One way to calibrate a clock is to slightly speed up or slow down the length of a second or other unit of time measured by the clock, to compensate for "drift" in the time base or internal time of the clock, as compared with another clock's time base. Drifting time bases are of particular concern when batteries are used as a power source for slave clocks, because some battery-powered clocks have a tendency to slow down as the battery is drained. Calibration of time drift is also important for non-battery-operated clocks.

In the present invention, and looking at FIG. 6, in order to maintain an adequate calibration among all clocks, and to further minimize battery power consumption, each slave clock performs a digital calibration on its time base each time the "window of opportunity" is opened and closed, namely at 4 o'clock, 8 o'clock and 12 o'clock in the example shown in FIG. 6. This ensures that the clock's transceiver will be open to receive time signals for a short time at the expected transmission time.

In yet another feature of the invention, the system disclosed herein can properly account for daylight savings time changes, or any other time changes or differences between the master clock and a slave clock, or between two slave clocks. Turning now to FIG. 7, this figure illustrates a normal operation of the receiver portion of one of the transceivers. At time t1 the transceiver time at a secondary clock is 8 o'clock and receives valid data from a master clock (or from another secondary clock) representing a time of 8 o'clock. Four hours later, the transceiver time is 12 o'clock and receives a valid time of 12 o'clock. Four hours later, the transceiver time is 4 o'clock; however, it receives a valid time of 3 o'clock (for example, daylight savings time). The transceiver then updates its time base for 3 o'clock and an hour later it opens its receiver again. The transceiver opens its receiver again an hour later. At this point, the secondary clock time will be set to 4 o'clock again, which now agrees with the correct time of 4 o'clock at the master clock. Thus, synchronization has been achieved even during periods of daylight savings time adjustment.

FIG. 8 shows the transmission of time signals by the transceiver. While the transceiver time is 8, 12 and 4 o'clock, the transceiver will transmit every 4 hours. However, if the transceiver time is changed by valid data, for example from 4 to 3 in a daylight savings time shift, the transceiver will transmit both the "old" time and the "new" time for some period. For example, as shown in FIG. 8, a transceiver transmits time signals at 4, 8 and 12 o'clock, as well as at 11, 3 and 7 o'clock. Preferably, this process continues for a period of three days, to ensure that all clocks in the system are synchronized and are receiving valid time data.

The above-described "window opening and closing" aspect of the invention has many advantages, and is further illustrated in FIG. 10. This figure shows a tabulation of clock times displayed at a master clock and two slave clocks over a 24-hour period, showing the ability of slave clocks of the present invention to adjust to time changes at a master clock, and the ability of a slave clock to recover from temporary interruptions in wireless signal reception. In this example, the master clock is wirelessly transmitting a normal time signal once per minute.

Starting at 1 o'clock, it can be seen that all three clocks are displaying the correct, identical time. In other words, both slave clocks are in synchronization with the master clock. The clocks continue in synchronization as the clocks reach 2 o'clock and 3 o'clock.

Shortly after 3 o'clock, in this example, someone manually changes the time at the master clock to 1:24 o'clock, for whatever reason. (For example, the master clock might be out of adjustment.) This may be called the "new" time. The time of this change is stored in a memory at the master clock. Now, the master clock transmits its normal minute-by-minute time signal. Meanwhile, the first slave clock, still "thinking" it is 4 o'clock, opens its receiver because, as discussed above, it is programmed to automatically open its receiver at 4, 8 and 12 o'clock. The first slave then receives the time signal from the master saying the "new" time is 1:24. The first slave then corrects its time to the "new" time of 1:24, and stores the time of this change in a memory at the slave clock. The first slave then retransmits this time data to the second slave. But for whatever reason, the second slave does not receive the signal, and the second slave continues to "think" it is 4:00, and continues to display its "old" time. At this point, the first slave is in synchronization with the master, but the second slave is out of synchronization.

Later, at 4:00, the first slave opens its receiver and receives a transmission of time data from the master. Still later, at 5:24, the first slave opens its receiver again, and receives time data from the master. The reason the receiver is opened again is that 4 hours have elapsed since the time the master clock was changed, namely 1:24. Thereafter, the first slave opens its receiver twice every 4 hours. The first "opening" occurs when the displayed clock time shows 4, 8 and 12 o'clock. The second opening occurs when 4 hours have elapsed since the time of the last "correction." Meanwhile, the second slave clock continues to open its receiver when its own displayed time shows 4, 8 and 12 o'clock, but the second slave is not receiving valid time data from either the master or the slave, for whatever reason.

Two other openings of the first slave's receiver occur later at 8:00 and 9:24. At this point, the time displayed at the second slave shows 12:00. Now, in this example, suppose the second slave suddenly starts to receive valid wireless time signals from the first slave at 9:24. The second slave immediately corrects its time from 12:00 to 9:24, because it assumes that the first slave is showing the "correct" time. At this point, all three clocks are in synchronization. Also, the system has been able to recover from a temporary loss of valid wireless reception. All clocks will remain in synchronization at all times thereafter, as long as each slave clock is within wireless reception range of either the master clock or at least one other slave clock.

The frequency and timing of the opening and closing of the transmitter and receiver portions of the transceiver 20 is preferably under software control. In addition, microcontroller 10 generates pseudo-random numbers, or performs a table look-up, to randomize the transmission frequencies from among the preselected range of frequencies and to randomize the start times of the time signal transmissions from among the preselected range of starting time points.

In another embodiment of the invention, a separate physical master clock is not needed. Rather, some other master time source may be used, such as a cellular telephone tower or other facility; a global positioning satellite (GPS) facility; a wireless facility broadcasting time data obtained over the Internet; a radio facility broadcasting time signals from an atomic clock, etc. For example, each slave clock may be configured to receive time signals from a cellular telephone tower antenna. In this embodiment, the cell phone tower substitutes for the master clock, because cell phone signal transmissions normally include a very accurate time component. In yet another embodiment of the invention, the invention does include a separate master clock, and the master clock receives time signals from the cell phone tower as well.

While the invention has been described herein with reference to certain preferred embodiments, these embodiments have been presented by way of example only, and not to limit the scope of the invention.

What is claimed is:

1. A wireless clock system comprising:
   a master time source including means for wirelessly transmitting time signals containing time data; and
   a plurality of slave clocks,
   each of the slave clocks including means for wirelessly receiving time signals which cause the slave clock to operate in synchronization with a source of the received time signals, the source of the received time signals for at least one of the slave clocks being the master time source and the source for each other one of the slave clocks being the master time source or another one of the slave clocks, and
   each of the slave clocks further including means for wirelessly transmitting time signals containing time data whereby the transmissions by the slave clocks are controllable to minimize or prevent signal conflict,
   wherein the second time signals are transmitted by the wireless transmission means in the slave clocks in a frequency hopping manner, and
   wherein the frequency hopping is performed in a doubly pseudorandom manner, the second time signals being transmitted pseudo randomly from among preselected radio transmission frequencies within a preselected range and at pseudo-randomly selected transmission start times within a preselected range, so as to minimize signal conflicts at the slave clocks.

2. The system of claim 1, wherein the master time source comprises a master clock.

3. The system of claim 1, wherein the master time source comprises a cellular telephone transmission facility.

4. The system of claim 1, wherein the master time source comprises a global positioning satellite facility.

5. The system of claim 1, wherein the master time source comprises a wireless transmission facility configured to receive time data over the Internet.

6. The system of claim 1, wherein any slave clock may be configured to operate as the master time source.

7. The system of claim 1, wherein the frequency hopping is performed in a pseudo-random manner.

8. The system of claim 1, wherein the means for wirelessly receiving the time signals comprises a receiver portion of a transceiver, and the means for wirelessly transmitting the time signals comprises a transmitter portion of the transceiver, the transceiver being controlled by a microcontroller operating under software control.

9. A method of operating a wireless clock system, comprising:
   wirelessly transmitting time signals from a master time source, the time signals containing time data;
   wirelessly receiving time signals at each of a plurality of slave clocks which cause the slave clock to operate in synchronization with a source of the received time signals, the source of the received time signals for at least one of the slave clocks being the master time source and the source for each other one of the slave clocks being the master time source or another one of the slave clocks; and
   wirelessly transmitting time signals containing time data from each of the slave clocks whereby the transmissions by the slave clocks are controllable to minimize or prevent signal conflict,
   wherein the step of transmitting the time signals from the slave clocks is performed in a frequency hopping manner, and
   wherein the frequency hopping is performed in a doubly pseudo- random manner, the time signals being transmitted pseudo-randomly from among preselected radio transmission frequencies within a preselected range and at pseudo-randomly selected transmission start times within a preselected range, so as to minimize signal conflicts at the slave clocks.

10. The method of claim 9, wherein the step of transmitting the time signals from the slave clocks is performed in a pseudo-random manner.

11. A wireless clock system comprising:
(a) a master time source including means for wirelessly transmitting time signals including current time data;
(b) at least one slave clock, the slave clock including receiving means for receiving the time signals; and
(c) means within the slave clock for conserving power by automatically activating and deactivating the receiving means at predetermined times and at predetermined intervals, each interval being longer than the previous interval, until valid time data is recognized from the time signals.

12. The system of claim 11, wherein the master time source comprises a master clock.

13. The system of claim 11, wherein the master time source comprises a cellular telephone transmission facility.

14. The system of claim 11, wherein the master time source comprises a global positioning satellite facility.

15. The system of claim 11, wherein the master time source comprises a wireless transmission facility configured to receive time data over the Internet.

16. The system of claim 11, wherein the receiving means comprises a receiver portion of a transceiver, and the transmitting means comprises a transmitter portion of the transceiver, the transceiver being controlled by a microcontroller operating under software control.

17. A method of operating a wireless clock system, comprising:
(a) wirelessly transmitting time signals including current time data from a master time source; and
(b) activating and deactivating a wireless receiver within a slave clock at predetermined times and at predetermined intervals, each interval being longer than the previous interval, until valid time data is recognized from the time signals.

18. The system of claim 1, wherein the master time source has a master time base and each slave device has a slave time base, further comprising means for calibrating the slave time base with the master time base.

19. A wireless clock comprising:
a clock including means for wirelessly transmitting time signals in a frequency hopping manner;
the frequency hopping being performed in a doubly pseudo-random manner, in which the time signals are transmitted pseudo-randomly from among preselected transmission frequencies within a preselected range and at pseudo randomly selected transmission start times within a preselected range.

20. A wireless clock system comprising:
(a) a master time source including means for wirelessly transmitting, at pseudo random frequencies and at pseudo random times, time signals containing data representing a current master time and a master time base;
(b) at least one slave clock, the slave clock capable of wirelessly and automatically receiving the time signals; and
(c) the slave clock further including means for wirelessly receiving the time signals, the time signals causing the second slave clock to operate in synchronization with the current master time, and causing a time base of the slave clock to be calibrated with the master time base.

21. A wireless clock system comprising:
a master time source including means for wirelessly transmitting first time signals containing time data;
a first slave clock, the first slave clock including means for wirelessly receiving the first time signals, the first time signals causing the first slave clock to operate in synchronization with the master time source;
the first slave clock further including means for wirelessly transmitting second time signals containing time data; and
a second slave clock, the second slave clock including means for wirelessly receiving the second time signals, the second time signals causing the second slave clock to operate in synchronization with the first slave clock,
the second time signals being transmitted in a frequency hopping manner,
the frequency hopping being performed in a doubly pseudo-random manner in which the second time signals are transmitted pseudo randomly from among preselected radio transmission frequencies within a preselected range and at pseudo randomly selected transmission start times within a preselected range, so as to minimize signal conflicts at the slave clocks.

22. A method of operating a wireless clock system, comprising:
wirelessly transmitting first time signals from a master time source, the first time signals containing time data;
wirelessly receiving the first time signals at a first slave clock, the first time signals causing the first slave clock to operate in synchronization with the master clock;
wirelessly transmitting second time signals from the first slave clock, the second time signals containing time data; and
wirelessly receiving the second time signals at a second slave clock, the time signals causing the second slave clock to operate in synchronization with the first slave clock
the step of transmitting the second time signals being performed in a frequency hopping manner,
the frequency hopping being performed in a doubly pseudo random manner in which the second time signals are transmitted pseudo randomly from among preselected radio transmission frequencies within a preselected range and at pseudo randomly selected transmission start times within a preselected range, so as to minimize signal conflicts at the slave clocks.

* * * * *